US008029261B2

(12) United States Patent
Narasaki et al.

(10) Patent No.: US 8,029,261 B2
(45) Date of Patent: Oct. 4, 2011

(54) TRANSFER BOARD

(75) Inventors: Masahiko Narasaki, Yamaguchi (JP); Tomoya Akutagawa, Yamaguchi (JP); Takamasa Maki, Osaka (JP); Minoru Uemura, Kyoto (JP)

(73) Assignee: Teijin Pharma Limited, Tokyo (JP)

( * ) Notice: Subject to any disclaimer, the term of this patent is extended or adjusted under 35 U.S.C. 154(b) by 245 days.

(21) Appl. No.: 12/527,350

(22) PCT Filed: Feb. 19, 2008

(86) PCT No.: PCT/JP2008/053127
§ 371 (c)(1),
(2), (4) Date: Sep. 8, 2009

(87) PCT Pub. No.: WO2008/102901
PCT Pub. Date: Aug. 28, 2008

(65) Prior Publication Data
US 2010/0092592 A1 Apr. 15, 2010

(30) Foreign Application Priority Data
Feb. 19, 2007 (JP) ................................ 2007-038086

(51) Int. Cl.
*B29C 43/34* (2006.01)

(52) U.S. Cl. ........................................ 425/78; 425/345

(58) Field of Classification Search .................... 425/78, 425/344–345, 352–355, 405.1–402.2
See application file for complete search history.

(56) References Cited

U.S. PATENT DOCUMENTS 2,946,298 A * 7/1960 Doepel et al. ................ 425/345
3,891,375 A * 6/1975 Pilewski et al. ............... 425/344
5,305,912 A * 4/1994 Johnston ........................... 222/1
5,910,324 A * 6/1999 Koch ............................ 425/345
2005/0013960 A1 1/2005 Ozeki et al.
2005/0269346 A1* 12/2005 Limback et al. .............. 221/198

FOREIGN PATENT DOCUMENTS

JP 2547180 B2 10/1996
WO 03/026560 A1 4/2003
WO 2005/030115 A1 4/2005

OTHER PUBLICATIONS

International Search Report of PCT/JP2008/053127 dated Mar. 25, 2008.

* cited by examiner

*Primary Examiner* — Richard Crispino
*Assistant Examiner* — Thukhanh Nguyen
(74) *Attorney, Agent, or Firm* — Sughrue Mion, PLLC

(57) ABSTRACT

A transfer board for transferring a columnar primary compression molded product which is supplied continuously one by one vertically in a shooter into a mortar of a secondary tablet compression machine, having at least an inclined portion having a plane-state inclined face, an input portion adjacent thereto, a portion for limiting drop of primary compression molded product, and a bottom plate provided at a lower part of the input portion, the inclined face being inclined so as to become lower toward the input portion, the inclined portion and the adjacent input portion performing a linear motion or rotary motion at a constant speed horizontally in a direction opposite to the input portion, and the input portion and the bottom plate being able to supply the primary compression molded product into the mortar of the secondary tablet compression machine while the columnar direction is kept substantially in a state of the horizontal direction.

8 Claims, 5 Drawing Sheets

TRANSFER BOARD

CROSS REFERENCE TO RELATED APPLICATION

This application is a National Stage of International Application No. PCT/JP2008/053127 filed Feb. 19, 2008, claiming priority based on Japanese Patent Application No. 2007-038086, filed Feb. 19, 2007, the contents of all of which are incorporated herein by reference in their entirety.

TECHNICAL FIELD

The present invention relates to a transfer board for transferring a columnar compression molded product into a mortar of a tablet compression machine. More specifically, the present invention relates to a transfer board suitable for transferring a primary compression molded product having a plurality of layers in a center axis direction of the column (hereinafter also referred to as "columnar direction") in the horizontal and a predetermined direction into a mortar of a tablet compression machine designed so that secondary compression molding can be applied from a direction different from that in the primary compression molding.

BACKGROUND ART

As a tablet having a multilayer structure, tablets having a substantially columnar shape and layers in the columnar direction are known. This type of tablets is manufactured by compression molding from the columnar direction. These tablets are useful as tablets for combination medicament which hold a plurality of drugs in a single tablet, but there is a problem that the shape of the tablet is limited to columnar or the like due to limitation caused by the above-mentioned manufacturing method.

A tablet having such a structure can be used as a scored tablet of the same drug, but application is difficult in view of a difficulty in division caused by difficulty in giving a splitting groove or the limitation on the shape to a column.

As another tablet having a multilayer structure, a core tablet having a core inside the tablet is known, and this is useful as a tablet for combination medicament or a scored tablet, but there is also a problem such as constraint on a thickness of the tablet, complexity of a tableting machine and the like caused by necessity to insert the core. In manufacture of this type of tablets, compression from a different direction is not performed as disclosed in the International Publication No. WO03/026560.

Compression is performed several times in tablet compression in many cases, but this is compression from the same direction, and its major purpose is to increase strength of the tablet after compression molding by expelling air existing between particles.

It is known in general that further compression to the primary compression molded product which might change its shape causes irreversible destruction of the molded product, and compression from a different direction is not carried out. That is, manufacture of a tablet by performing compression molding again to a compression molded product containing those having a multilayer structure from a direction different from the compression direction has not been carried out and thus, a tablet compression machine for that purpose has not been known. Naturally, a transfer board suitable for transferring a primary compression molded product into a mortar of a secondary compression molding machine in a predetermined direction in order to apply secondary compression to the primary compression molded product from a direction different from that of the primary compression has not been known, either.

As a transfer board for a tablet compression machine, a transfer board for manufacturing a core tablet is known.

DISCLOSURE OF THE INVENTION

An object to be achieved by the present invention is to provide a transfer board that can transfer a primary compression molded product into a mortar of a secondary tablet compression machine in order to apply secondary compression to the primary compression molded product which is layered in the columnar direction from a direction different from that of the primary compression. More specifically, an object is to provide a transfer board for changing a direction of the primary compression molded products continuously supplied one by one due to its own weight since they continue vertically in a shooter and transferring the products into a mortar of a secondary tablet compression machine in a state where the columnar direction is substantially horizontal and a long-axis direction of the mortar matches a long-axis direction of the primary compression molded product.

Such an object is achieved by a transfer board for transferring a columnar primary compression molded product whose two bottom faces may be bulged and which is supplied continuously one by one due to its own weight since the products continue vertically in a shooter into a mortar of a secondary tablet compression machine in a state where the columnar direction is substantially horizontal, having at least an inclined portion having a plane-state inclined face, an input portion adjacent thereto, a portion for limiting drop of primary compression molded product, and a bottom plate provided at a lower part of the input portion, the inclined face being inclined so as to become lower toward the input portion, the inclined portion and the adjacent input portion perform a linear motion or rotary motion horizontally at a constant speed in a direction opposite to the input portion, and the input portion and the bottom plate being able to supply the primary compression molded product into the mortar of the secondary tablet compression machine while the columnar direction is kept substantially in a state of the horizontal direction.

By means of the above transfer board, the primary compression molded product having a plurality of layers in the columnar direction can be transferred into the mortar of the secondary tablet compression machine in a predetermined direction in order to apply secondary compression to the primary compression molded product from a direction different from that of the primary compression. As a result, tablets for combination medicament and scored tablets can be manufactured easily and with high accuracy. Also, a tablet containing drug which might cause tableting troubles can be molded into arbitrary shapes.

That is, with regard to the primary compression molded product inputted to the inclined face in a state where the columnar direction is substantially the vertical direction, a lower part of the primary compression molded product moves in a travelling direction of the inclined face, while an upper part of the primary compression molded product moves in the opposite direction due to friction between the inclined face and the lower part of the primary compression molded product, that is, the product is rotated and placed on the bottom plate in the input portion in a state where its posture is controlled. Moreover, the product is moved with horizontal movement of the inclined portion and the input portion and then, inputted into the mortar of the secondary tablet compression machine in a state of substantially the horizontal direction.

EXPLANATION OF REFERENCE NUMERALS

Figure 1:
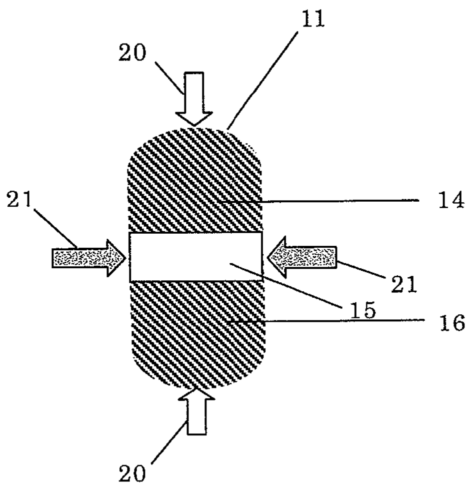
FIG. 1 is a diagram illustrating an example of a primary compression molded product to become a transfer target of a transfer board of the present invention.

1 portion for limiting drop of primary compression molded product
2 inclined portion
3 traveling direction of transfer board
4 width on inclined portion
5 height of lowest portion of inclined portion
6 height of highest portion of inclined portion
7 length of inclined face
8 input portion
9 length of transfer board outer circumference portion in input portion
10 portion opposing inclined portion of input portion
11 primary compression molded product
12 height of primary compression molded product
13 width of primary compression molded product
14 drug containing layer of primary compression molded product
15 additive layer of primary compression molded product
16 drug containing layer of primary compression molded product
17 drug containing layer of secondary compression molded product
18 additive layer of secondary compression molded product
19 drug containing layer of secondary compression molded product
20 direction of primary compression molding
21 direction of secondary compression molding
22 mortar for secondary compression molding
23 lower pestle for secondary compression molding
24 turntable
25 upper pestle for secondary compression molding
26 vibration feeder
27 shooter

BEST MODE FOR CARRYING OUT THE INVENTION

First, two-stage tablet compression will be described.

The inventors have obtained new findings that by applying secondary compression molding to a primary compression molded product from a direction different from a primary compression direction using a mortar, an upper pestle, and a lower pestle with specific shapes, a tablet with a arbitrary shape, which is not limited to a columnar shape, can be manufactured even though the tablet has a multilayer structure. This is an unexpected fact from a technical common sense that application of compression to the primary compression molded product to change the shape causes irreversible destruction of the molded product.

The present invention relates to a transfer board for transferring the primary compression molded product having a plurality of layers in the columnar direction into a mortar of a tablet compression machine for performing such secondary tablet compression, but until the above finding is obtained, there could never be such a request that the primary compression molded product substantially columnar in the vertical direction should be rotated so that the columnar direction becomes substantially the horizontal direction and transferred into the mortar of the secondary tablet compression machine with a direction such that the long axis direction of the mortar matches the long axis direction of the primary compression molded product.

The primary compression molded product to become a target of the transfer board of the present invention has a shape of a column, whose two bottom faces may have bulged portions. Specifically, the shape is basically a column made of columnar layers containing or not containing drug stacked in plural, but its one or two bottom faces may have bulged portions on the outside. Typically, it may be a bulge in the shape forming a part of a spherical face, but the shape does not matter as long as it can be made by a dent on an upper face of a lower pestle or a lower face of an upper pestle used in the primary compression molding. The drug contained by the primary compression molded product may be one type or several types depending on the purpose. The type or content of the drug is not limited as long as it does not disable secondary compression molding.

Specifically, there can be an example in which a layer containing drug is divided by an additive layer not containing drug. If a target tablet is a tablet for combination medicament, different drugs are contained in different layers, while if the target tablet is a scored tablet, the same drug is contained in the different layer. For example, as a tablet for combination medicament, a three-layered columnar one in which two drug containing layers (14 and 16 in FIG. 1) containing two types of different drugs whose physical contact between them is not preferable, respectively, are divided by a single additive layer not containing drug (15 in FIG. 1) can be cited. As a scored tablet, a three-layered columnar product in which two drug containing layers (14 and 16 in FIG. 1) containing the same drug are divided by a single additive layer not containing drug (15 in FIG. 1) can be cited. Such primary compression is applied in a columnar direction (20 in FIG. 1).

Figure 2:
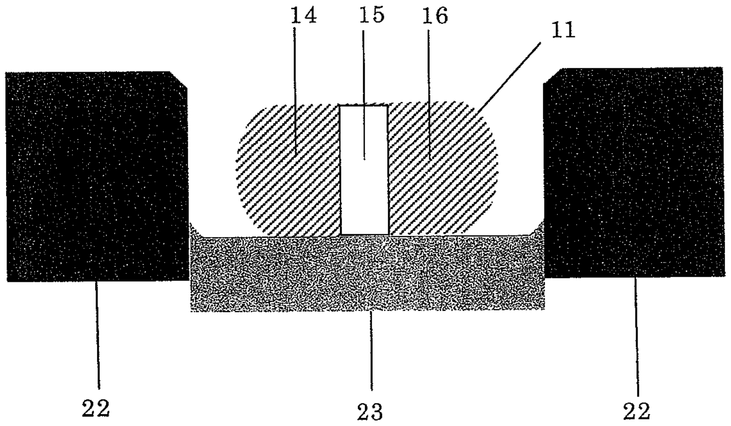
FIG. 2 is a diagram of the primary compression molded product transferred by the transfer board of the present invention and placed on a dent formed by an inner face of a mortar and an upper face of a lower pestle for secondary compression molding seen from a direction perpendicular to the columnar direction.
Figure 3:
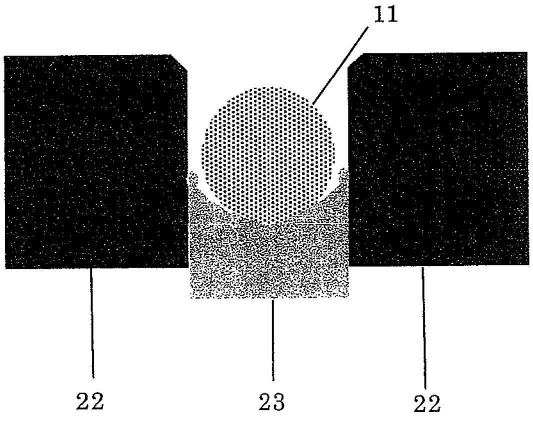
FIG. 3 is a diagram of the primary compression molded product transferred by the transfer board of the present invention and placed on the dent formed by the inner face of the mortar and the upper face of the lower pestle for secondary compression molding seen from the columnar direction.
Figure 4:
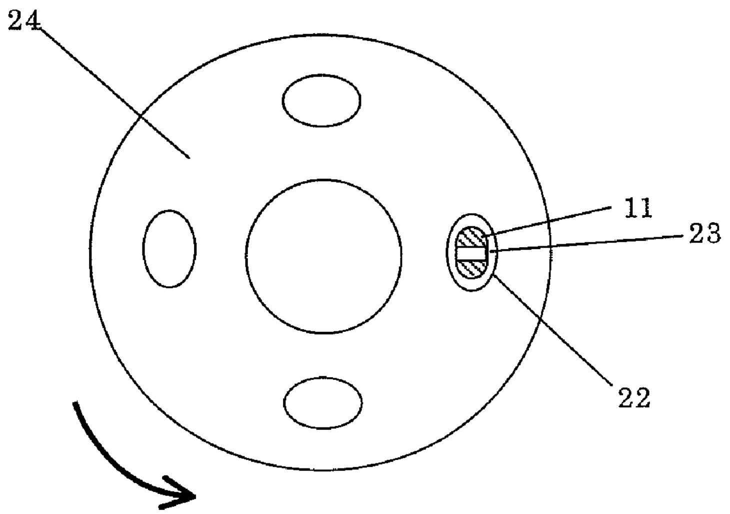
FIG. 4 is a diagram illustrating the mortar and the lower pestle mounted on a turntable for secondary tablet compression.
Figure 5:
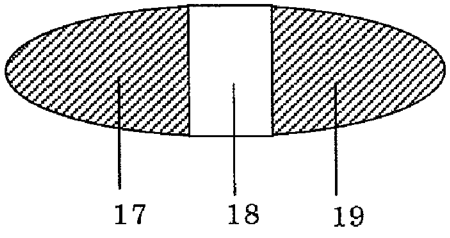
FIG. 5 is a diagram illustrating an example of a secondary compression molded product.

An example of the mortar and the lower pestle used in the secondary compression molding is shown in FIGS. 2 and 3. Also, an example of a state in which they are mounted on a turntable is shown in FIG. 4. That is, the primary compression molded product is received by a dent formed by an inner face of the mortar and an upper face of the lower pestle, and by applying secondary tablet compression by the mortar, the upper pestle, and the lower pestle, a multilayer tablet with a desired structure not limited to columnar (secondary compression molded product) is obtained. An example of such a secondary compression molded product is shown in FIG. 5. The lower pestle and the upper pestle can be moved vertically in the mortar.

The present invention is a transfer board for transferring primary compression molded products (11) continuously supplied one by one due to its own weight since they continue vertically in a shooter (27 in FIG. 6) and whose columnar direction is substantially in the vertical direction at least in the vicinity of a shooter outlet into a mortar of a secondary tablet compression machine constituted at least by a mortar (22), a lower pestle (23), and an upper pestle (25) in a state where the columnar direction is substantially in the horizontal direction. The primary compression molded product needs to be placed in the mortar so that a predetermined direction, that is, a long axis direction of the mortar matches a long axis direction of the primary compression molded product, but the transfer board of the present invention satisfies such a request. A rotary tablet compression machine is preferable as a secondary tablet compression machine to which the transfer board of the present invention is applied.

Such a shooter is a tubular article having an inner diameter slightly larger than a diameter of the columnar portion of the primary compression molded product. In a state where the transfer board of the present invention is being operated, the primary compression molded products are aligned vertically in a state where the columnar direction matches the length direction of the tube in the shooter. The vicinity of the shooter outlet is substantially vertically downward, and the other portions of the shooter are also installed in a state where if the primary compression molded products in the vicinity of the outlet located at the lowest in the shooter are removed, the primary compression molded products can sequentially slide down as long as the primary compression molded products are continuously supplied to a shooter inlet. A predetermined interval is provided between the shooter outlet and the transfer board of the present invention. This shooter is a simple and suitable mechanism that can be applied to the transfer board of the present invention, and the description of the present invention will be made on the premise that such a shooter is used, but it is not indispensable for the transfer board of the present invention, and another mechanism playing the same role may be substituted.

In the transfer board of the present invention, in a state where a portion for limiting drop of primary compression molded product, which will be described later, is located immediately below the outlet, free fall of the primary compression molded product partially exposed of the shooter outlet is prevented. Since the primary compression molded products are aligned vertically in the shooter, unless the primary compression molded product partially exposed of the shooter outlet is removed, the primary compression molded product above it will not be exposed of the shooter outlet. When the primary compression molded product in the vicinity of the outlet is removed, the primary compression molded product above it by one is exposed of the vicinity of the outlet, and the primary compression molded product further above advances sequentially downward in a single row.

Figure 6:
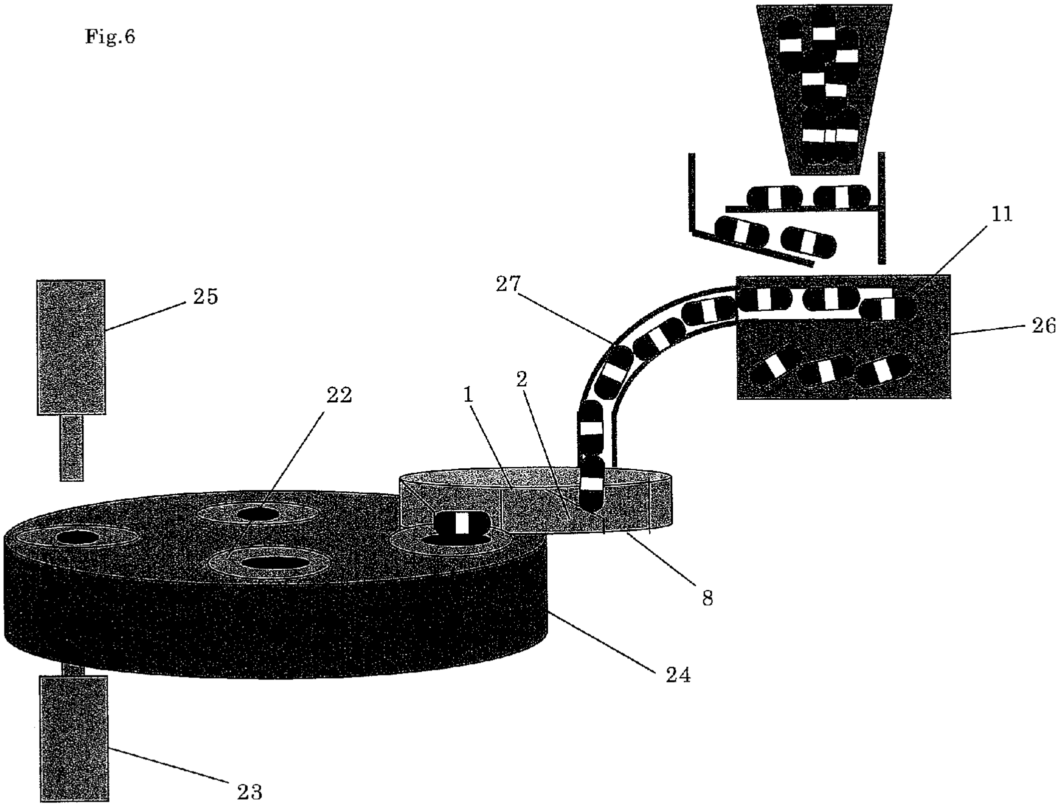
FIG. 6 is a diagram illustrating a state of use of the transfer board of the present invention.

A method of filling the primary compression molded products vertically in the shooter is not limited, but by using a vibration feeder known to those skilled in the art, for example, efficient filling is achieved (26 in FIG. 6).

The transfer board of the present invention (FIG. 7) has at least the portion for limiting drop of primary compression molded product (1 in FIG. 7), an inclined portion (2 in FIG. 7), an input portion (8 in FIG. 7), and a bottom plate. Each constituting portion of the transfer board of the present invention will be described below in detail.

<Portion for Limiting Drop of Primary Compression Molded Product>

If the inclined portion or input portion is not located immediately below the shooter, a mechanism for preventing free fall of the primary compression molded product from the shooter is required. As long as such a function can be realized, a mechanism of a portion for limiting drop of primary compression molded product does not matter. For example, a kind of shutter mechanism for limiting drop of the primary compression molded product by electrically detecting a state immediately below the shooter can be provided. However, a plane-state horizontal portion having the same height as the highest portion of the inclined portion which continues to the inclined portion or the like and horizontally moves with them can be easily provided as a portion for limiting drop of primary compression molded product and it is preferable (1 in FIGS. 7 to 10). In this case, the portion for limiting drop of primary compression molded product needs the horizontal upper plane and if it is provided, a shape of the other portions is not limited as long as the function as the transfer board of the present invention is not prevented.

<Inclined Portion>

The inclined portion has an inclined face on top of it, and the inclined portion is inclined so that it becomes lower toward the input portion. That is, the inclined portion of the present invention needs an inclined upper plane (inclined face), and the other portions may be hollow as long as the inclined face is provided, and it does not have to have a bottom face. A shape of the inclined face is not particularly limited as long as the function to rotate the primary compression molded product, which will be described later, is exerted, but a substantial quadrangle is preferable and a trapezoid in which opposing two parallel sides are located in the horizontal direction is more preferable. In this case, one of the opposing two parallel sides becomes the highest portion of the inclined face, while the other side becomes the lowest portion. As a shape of the inclined face, a rectangle is particularly preferable. If the shape of the inclined face is trapezoidal or rectangular, the entire side as the lowest portion of the inclined face is preferably connected to the input portion.

However, since the transfer board of the present invention is suitably constituted as a part of a disc-shaped member as will be described later, the inclined face as the upper face of the inclined portion is preferably formed in the fan shape conforming to the shape of the board in that case.

A suitable range of the width of the inclined face is such that a value of a ratio to a width of the primary compression molded product to be transferred is 0.5 to 1.5. The "width of the inclined face", here, refers to a length of a line where the inclined face crosses the horizontal plane (4 in FIG. 7, for example). Also, the "width of the primary compression molded product" refers to a diameter of the columnar portion (13 in FIG. 8).

A suitable range of the height of the lowest portion of the inclined portion (5 in FIG. 7) is such that a value of a ratio to the height of the primary compression molded product is 0.5 or less. The "height of the primary compression molded product", here refers to the columnar portion added with the above-mentioned bulge on the bottom face portion (12 in FIG. 8).

Moreover, it is preferable that a difference between the height of the highest portion (6 in FIG. 7) and the height of the lowest portion (5 in FIG. 7) of the inclined portion is the height of the primary compression molded product or less and a ratio to the length on the inclined face of the difference (7 in FIG. 7) is 0.1 to 0.3.

Using a general dimension of the primary compression molded product offered for the transfer board of the present invention having the height (12 in FIG. 8) of 7 mm and the width (13 in FIG. 8) of 5 mm as an example, it is preferable that the width of the inclined face (4 in FIG. 7) is 2 to 7 mm, the height of the highest portion of the inclined portion (6 in FIG. 7) is 2 to 4 mm, the height of the lowest portion of the inclined face (5 in FIG. 7) is 0.5 to 1.5 mm, and the length of the inclined face (7 in FIG. 7) is 10 to 15 mm. In the case out of the ranges, it becomes highly likely that the primary compression molded product does not fall at all or does not fall at an appropriate position.

Those skilled in the art could easily determine the suitable numerical values through trials according to the shape of the given primary compression molded product and a friction coefficient between the compression molded product and the inclined portion, referring to the suitable ranges of the general dimensions of the primary compression molded product.

<Input Portion>

The input portion in the transfer board of the present invention needs to be a gap or a hole in a shape through which at least the columnar direction of the primary compression molded product can pass substantially in the horizontal direction. The shape of the input portion includes a shape of a gap obtained by penetrating a member in the vertical direction with a rectangle placed horizontally, for example.

A portion opposing the inclined portion (10 in FIG. 7) forming the input portion is preferably a plane in the vertical direction. If a projection is provided on the upper part, for example, the compression molded product might be cut off by the projection.

If the transfer board of the present invention is to be constituted by a part of a disc-shaped member, the shape of such a hole may be a fan shape conforming to the shape of the board similarly to the above description on the inclined face. Such an example is shown as (8) in FIG. 7.

If the input portion is not a hole but a gap a part of which is open, a guide rail may be provided on one or both side faces of the input portion as necessary. As a result, the primary compression molded product can be appropriately moved to the upper part of the mortar of the secondary tablet compression machine.

Figure 7:
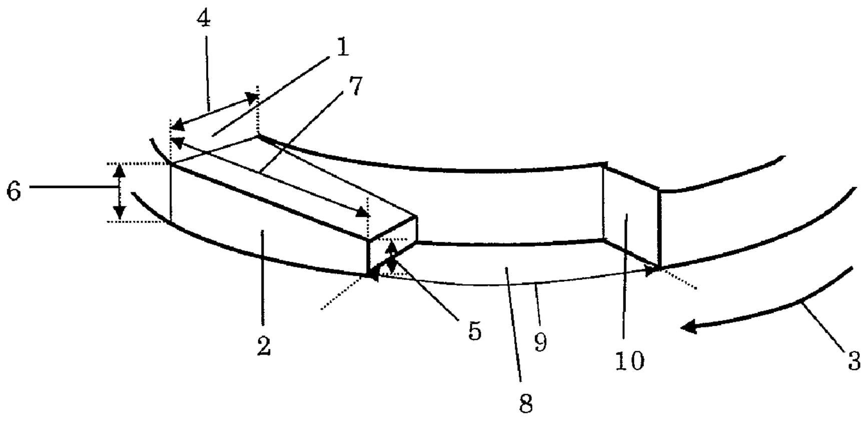
FIG. 7 is a diagram illustrating an example of the transfer board of the present invention.

For example, in the transfer board shown in FIG. 7, a front portion of the input portion (8) is open, and the primary compression molded product having moved to the input portion is located on the bottom plate (not shown) and between the shown input portion and the front guide rail, not shown, and fed to the upper part of the mortar in the horizontal direction.

The guide rail may be mounted directly on the transfer board of the present invention (therefore, it moves along with the input portion) or may be fixed to the secondary tablet compression machine along a trajectory of the side face of the input portion with a gap from the input portion to such a degree that the primary compression molded product does not jump off (therefore, it does not move with the input portion). However, the operation of the upper pestle should not be prevented in any case. Also, the input portion should have a shape by which rotation in the horizontal direction of the primary compression molded product placed inside can be prevented together with the guide rail, if any. That is because the primary compression molded product is to be inputted into the mortar in a predetermined direction.

<Bottom Plate>

In the transfer board of the present invention, a bottom plate is provided so that the primary compression molded product does not fall down from the input portion other than at the upper part of the mortar of the secondary tablet compression machine but it can be inputted into the mortar when the input portion comes to above the mortar. As long as this function is exerted, a bottom plate of any mechanism may be used. For example, a bottom plate fixed to a bottom portion of the input portion (therefore, it moves with the input portion) and through which the primary compression molded product can be inputted into the mortar by an open mechanism when necessary may be provided. However, a flat plate for preventing drop of the primary compression molded product not fixed to the input portion and thus, not movable with the input portion can be provided below the trajectory of movement of the input portion easily and preferably. However, since the upper face of itself can be made to function as the bottom plate on the secondary tablet compression machine provided with the mortar, the bottom plate does not have to be provided at that portion. In this embodiment, the primary compression molded product is located in a space formed by the input portion and the bottom plate in a state where the columnar direction is the horizontal direction and is moved to the upper part of the mortar of the secondary tablet compression machine with movement of the input portion in the horizontal direction. That is, the primary compression molded product slides and moves on the bottom plate by being pushed by a wall face constituting the input portion while maintaining substantially horizontal and predetermined direction and is contained in the mortar of the secondary tablet compression machine maintaining an appropriate direction.

An action of the present invention will be described below.

In the transfer board of the present invention, at least the inclined portion and the adjacent input portion make a linear motion or rotary motion by power at a constant speed horizontally in a direction opposite to the input portion, in other words, from the lowest spot to the highest spot of the inclined face.

Figure 8:
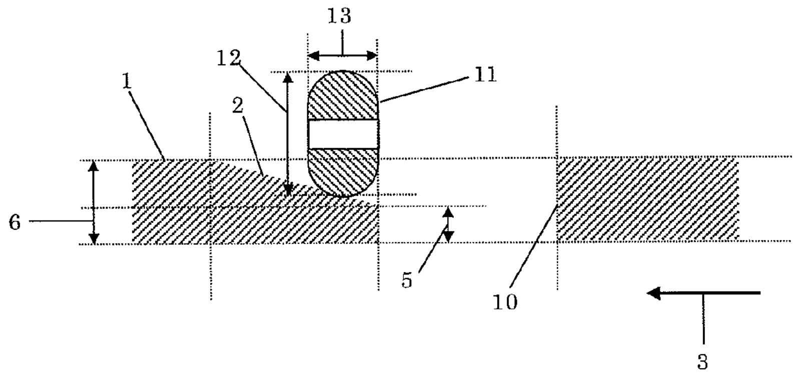
FIG. 8 is a sectional view of a portion for limiting drop of primary compression molded product, an inclined portion, and an input portion of the transfer board of the present invention shown with a diagram of a state in which the primary compression molded product to be supplied is brought into contact with the inclined portion.
Figure 9:
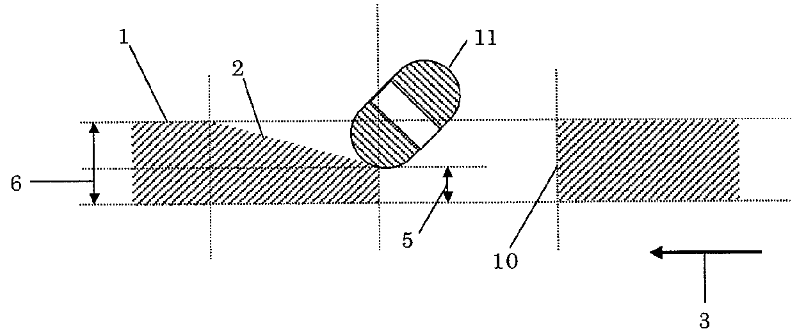
FIG. 9 is a sectional view of the portion for limiting drop of primary compression molded product, the inclined portion, and the input portion of the transfer board of the present invention shown with a diagram of a state in which the primary compression molded product to be supplied is brought into contact with the inclined portion and then, the transfer board is moved and the primary compression molded product is in the middle of rotation.
Figure 10:
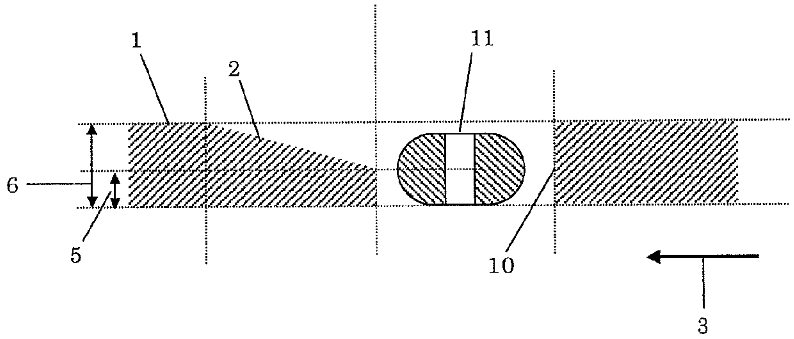
FIG. 10 is a sectional view of the portion for limiting drop of primary compression molded product, the inclined portion, and the input portion of the transfer board of the present invention shown with a diagram of a state in which the primary compression molded product to be supplied is brought into contact with the inclined portion and then, the transfer board has been moved and rotated till the columnar direction of the primary compression molded product becomes horizontal.

Until the inclined portion reaches immediately below the shooter, drop of the primary compression molded product is limited by the portion for limiting drop of primary compression molded product such as a horizontal portion adjacent to the inclined portion, for example, but when the inclined portion reaches immediately below the shooter by the horizontal movement, the primary compression molded product is lowered to the height of the inclined face immediately below the shooter (FIG. 8, the shooter is not shown). The degree gets larger as the inclined portion advances. At that time, the primary compression molded products aligned vertically in the shooter are also lowered sequentially in accordance with that. If the length and inclination of the inclined portion, a horizontal moving speed of the transfer board, and a gap between the transfer board and the shooter outlet of the present invention are appropriate, the primary compression molded product has its upper part further rotated by 90 degrees in a direction opposite to the traveling direction as in FIGS. 9 and 10 and contained in the space constituted by the input portion and the bottom plate in a state where the columnar direction is a horizontal direction. Then, the subsequent primary compression molded product is partially exposed of the shooter outlet in a form in which drop is limited by the portion for limiting drop of primary compression molded product and the above action is repeated.

In the transfer board of the present invention, the object is achieved by a pair of inclined portion and input portion as well as the portion for limiting drop of primary compression molded product and the bottom plate, but plural pairs of inclined portions and input portions are preferably provided. Particularly, if the portion for limiting drop of primary compression molded product is the above-mentioned plane-state horizontal portion, a set constituted by the portion for limiting drop of primary compression molded product, the inclined portion, and the input portion in this order is preferably provided in plural.

The above motion is preferably a rotary motion since the device can be simplified by that and the plural sets can be provided easily. Therefore, the transfer board of the present invention is suitably constituted as a part of the disc-shaped member. At that time, eight sets of the portion for limiting drop of primary compression molded product, the inclined portion, and the input portion can be provided on a single disc, for example.

The present invention also includes the above transfer board further having the shooter in which at least the vicinity of the outlet is directed vertically downward and the outlet is fixed above with a given distance from the inclined portion. The given distance refers to that a distance from the highest portion of the inclined portion is a predetermined value, for example. Particularly, the distance from the shooter outlet to the highest position of the inclined portion is preferably 1.0 to 5.0 mm and particularly preferably 1.5 to 2.5 mm.

EXAMPLE

The disc-shaped transfer board shown in FIG. 7 is manufactured. The transfer board has eight sets of "the portion (1) for limiting drop of primary compression molded product having a plane-state horizontal portion, the inclined portion (2) adjacent thereto, and the input portion (8) adjacent thereto". The plane-state horizontal portion has the same height as the highest portion of the inclined portion and uses a part of the upper face of the board before being worked. The inclined portion (2) is linearly lowered toward the input portion (8), and its upper face is in the fan shape conforming to the shape of the board. The primary compression molded product in use has the shape shown in FIG. 1 with a height of 7 mm and a width of 5 mm, and thus, a width of the inclined face of the inclined portion is 5 mm, a height of the highest portion of the inclined portion is 3 mm, a height of the lowest portion of the inclined face is 1 mm, and a length of the inclined face is 12 mm. The input portion (8) is a fan-shaped hole conforming to the shape of the board and is constituted by a vertical face (5) provided on the input portion side of the inclined portion (2), an end face (10) of the portion (1) for limiting drop of primary compression molded product subsequent to that, and a face in the depth of the figure connecting these faces. A length (9) of an outer circumference part of the transfer board of the input portion is 7 mm. A guide rail, not shown, is provided on the front side of the input portion (8). Each portion is manufactured by working a single disc which is not hollow. The bottom face of the transfer board is a single plane including the bottom faces of the portion for limiting drop of primary compression molded product and the inclined portion. On a face below the trajectory drawn by the rotary motion (3) of the input portion (8), the plane-state bottom plate is provided except the upper portion of the mortar. This transfer board was operated while the primary compression molded product was supplied through the shooter using a vibration feeder, and most of the primary compression molded products were contained in the predetermined direction in the mortar of the rotary tablet compression machine and intended secondary compression molding was accomplished. As a result, it is confirmed that the transfer board of the present invention can exert sufficient performance in practical use.

INDUSTRIAL APPLICABILITY

The transfer board of the present invention is used for manufacture of a multilayer tablet, which is a pharmaceutical product.

The invention claimed is:

1. A transfer board for transferring a columnar primary compression molded product whose two bottom faces may be bulged and which is supplied continuously one by one due to its own weight since the products continue vertically in a shooter into a mortar of a secondary tablet compression machine in a state where the columnar direction is substantially horizontal, having at least an inclined portion having a plane-state inclined face, an input portion adjacent thereto, a portion for limiting drop of primary compression molded product, and a bottom plate provided at a lower part of the input portion, the inclined face being inclined so as to become lower toward the input portion, the inclined portion and the adjacent input portion performing a linear motion or rotary motion at a constant speed horizontally in a direction opposite to the input portion, and the input portion and the bottom plate being able to supply the primary compression molded product into the mortar of the secondary tablet compression machine while the columnar direction is kept substantially in a state of the horizontal direction.

2. The transfer board according to claim 1, wherein the secondary tablet compression machine is the rotary tablet compression machine.

3. The transfer board according to claim 1, wherein the portion for limiting drop of primary compression molded product is a plane-state horizontal portion adjacent to the highest portion of the inclined face of the inclined portion.

4. The transfer board according to claim 1, wherein the inclined face is a fan shape.

5. The transfer board according to claim 4, wherein a ratio of the width of the inclined face to the width of the primary compression molded product to be transferred is 0.5 to 1.5, a ratio of the height of the lowest portion of the inclined portion to the height of the primary compression molded product is 0.5 or less, a difference between the highest portion and the lowest portion of the inclined portion is the height of the primary compression molded product or less, and a ratio of the difference to a length of the inclined face is 0.1 to 0.3.

6. The transfer board according to claim 4, wherein the width of the inclined face is 2 to 7 mm, the heights of the highest portion and the lowest portion of the inclined portion are 2 to 4 mm, 0.5 to 1.5 mm, respectively, the length of the inclined portion is 10 to 15 mm, and a length of a transfer-board inner circumferential portion of the input portion is 5 to 9 mm.

7. The transfer board according to claim 1, wherein a motion of the inclined portion and the input portion adjacent thereto is a rotary motion.

8. The transfer board according to claim 1, further comprising a shooter in which at least the vicinity of an outlet thereof is vertically downward and the outlet is fixed to an upper part with a certain distance from the inclined portion, wherein a distance from the outlet to the highest position of the inclined portion is 1.0 to 5.0 mm.

* * * * *